United States Patent
Rogers et al.

(10) Patent No.: US 11,230,493 B2
(45) Date of Patent: *Jan. 25, 2022

(54) INTERIOR COATINGS FOR GLASS STRUCTURES IN ELECTRONIC DEVICES

(71) Applicant: Apple Inc., Cupertino, CA (US)

(72) Inventors: Matthew S. Rogers, San Jose, CA (US); Que Anh S. Nguyen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,944

(22) Filed: Jan. 16, 2020

(65) Prior Publication Data

US 2020/0148588 A1 May 14, 2020

Related U.S. Application Data

(63) Continuation of application No. 16/000,606, filed on Jun. 5, 2018, now Pat. No. 10,556,823.

(Continued)

(51) Int. Cl.
*B32B 17/06* (2006.01)
*C03C 17/36* (2006.01)
*C03C 17/38* (2006.01)

(52) U.S. Cl.
CPC .......... *C03C 17/3639* (2013.01); *B32B 17/06* (2013.01); *C03C 17/36* (2013.01);
(Continued)

(58) Field of Classification Search
CPC . C03C 17/36; C03C 17/3639; C03C 17/3636; C03C 17/3615; C03C 17/3649;
(Continued)

(56) References Cited

U.S. PATENT DOCUMENTS

| 7,005,189 B1 | 2/2006 | Tachibana et al. |
| 8,638,549 B2 | 1/2014 | Garelli et al. |

(Continued)

FOREIGN PATENT DOCUMENTS

| CN | 1173428 A | 2/1998 |
| CN | 1332672 A | 1/2002 |

(Continued)

OTHER PUBLICATIONS

Tainning et al., Optical mold manufacturing technology, Art Studies-Optical Parts Materials: Disciplines from the school. Teaching material) Optical piano and art (discipline: high school and animal husbandry: teaching material, Oct. 1981, p. 195, North Number: Expansion of Zhuoye Publishing House, 198 on 01.

*Primary Examiner* — Elizabeth E Mulvaney
(74) *Attorney, Agent, or Firm* — Treyz Law Group, P.C.; G. Victor Treyz; David K. Cole

(57) ABSTRACT

An electronic device may include electrical components and other components mounted within a housing. The device may have a display on a front face of the device and may have a glass layer that forms part of the housing on a rear face of the device. The glass layer and other glass structures in the electronic device may be provided with coatings. An interior coating on a glass layer may include multiple layers of material such as an adhesion promotion layer, thin-film layers of materials such as silicon, niobium oxide and other metal oxides, and metals to help adjust the appearance of the coating. A metal layer may be formed on top of the coating to serve as an environmental protection layer and opacity enhancement layer. In some configurations, the coating may include four layers.

20 Claims, 5 Drawing Sheets

Related U.S. Application Data

(60) Provisional application No. 62/522,561, filed on Jun. 20, 2017.

(52) U.S. Cl.
CPC ...... *C03C 17/3615* (2013.01); *C03C 17/3636* (2013.01); *C03C 17/3649* (2013.01); *C03C 17/3652* (2013.01); *C03C 17/3684* (2013.01); *C03C 17/38* (2013.01); *C03C 2217/212* (2013.01); *C03C 2217/218* (2013.01); *C03C 2217/253* (2013.01); *C03C 2217/258* (2013.01); *C03C 2217/28* (2013.01); *C03C 2217/445* (2013.01); *C03C 2217/478* (2013.01); *C03C 2217/485* (2013.01); *C03C 2217/72* (2013.01); *C03C 2217/78* (2013.01); *C03C 2217/90* (2013.01); *C03C 2218/36* (2013.01)

(58) Field of Classification Search
CPC .. C03C 17/3652; C03C 17/3684; B32B 17/06
See application file for complete search history.

(56) References Cited

U.S. PATENT DOCUMENTS

| | | |
|---|---|---|
| 2007/0229945 A1 | 10/2007 | Shibuya |
| 2010/0021744 A1 | 1/2010 | Myerson et al. |
| 2011/0188179 A1 | 8/2011 | Myers et al. |
| 2014/0090864 A1 | 4/2014 | Paulson |
| 2014/0139978 A1 | 5/2014 | Kwong |
| 2015/0004383 A1 | 1/2015 | Sandre-Chardonnal |
| 2015/0062709 A1 | 3/2015 | Matsuyuki et al. |
| 2015/0064432 A1 | 3/2015 | Matsuyuki et al. |
| 2016/0035616 A1 | 2/2016 | Cheng et al. |
| 2016/0062398 A1 | 3/2016 | Pakula et al. |
| 2016/0299527 A1 | 10/2016 | Kwak et al. |
| 2016/0324016 A1 | 11/2016 | Bellman et al. |
| 2017/0320294 A1 | 11/2017 | Yamamoto et al. |
| 2018/0037488 A1 | 2/2018 | Liu et al. |

FOREIGN PATENT DOCUMENTS

| | | |
|---|---|---|
| CN | 1145551 C | 4/2004 |
| CN | 1852871 A | 10/2006 |
| CN | 100474003 C | 4/2009 |
| CN | 202085409 U | 12/2011 |
| CN | 103551594 A | 1/2014 |
| CN | 104039732 A | 9/2014 |
| CN | 104205355 A | 12/2014 |
| CN | 104422977 A | 3/2015 |
| CN | 204242152 U | 4/2015 |
| CN | 104718071 A | 6/2015 |
| CN | 105980324 A | 9/2016 |
| CN | 106024804 A | 10/2016 |
| CN | 106132141 A | 11/2016 |
| EP | 1155816 A1 | 11/2001 |
| JP | 2000246831 A | 9/2000 |
| JP | 2002103507 A | 4/2002 |
| JP | 2002530712 A | 9/2002 |
| JP | 2002350610 A | 12/2002 |
| JP | 20070298951 A | 11/2007 |
| JP | 2009090639 A | 4/2009 |
| JP | 2010287645 A | 12/2010 |
| JP | 2013519151 A | 5/2013 |
| JP | 2014522112 A | 8/2014 |
| JP | 2015506331 A | 3/2015 |
| JP | 2015529188 A | 10/2015 |
| JP | 2015535804 A | 12/2015 |
| JP | 2016540310 A | 12/2016 |
| JP | 3208984 U | 3/2017 |
| JP | 2017509572 A | 4/2017 |
| KR | 102007009454 A | 10/2007 |
| WO | 2014084268 A1 | 6/2014 |
| WO | 2015030015 A1 | 3/2015 |
| WO | 2015121632 A1 | 8/2015 |
| WO | 2016121956 A1 | 8/2016 |

INTERIOR COATINGS FOR GLASS STRUCTURES IN ELECTRONIC DEVICES

This patent application is a continuation of U.S. patent application Ser. No. 16/000,606, filed on Jun. 5, 2018, which claims the benefit of provisional patent application No. 62/522,561, filed on Jun. 20, 2017, which are hereby incorporated by reference herein in their entireties.

BACKGROUND

This relates generally to coatings, and, more particularly, to coatings for glass structures in electronic devices.

Electronic devices such as cellular telephones, computers, watches, and other devices may contain glass structures. For example, electronic devices may have displays in which an array of pixels is covered with a transparent layer of glass. In some devices, a rear housing wall may be covered with a layer of glass.

If care is not taken, glass structures may be susceptible to cracking when subjected to elevated stress such as during an unintended drop event. The appearance of a glass structure in an electronic device can be improved by forming a thin-film coating on the glass structure. However, the presence of thin-film coatings on an inner glass surface has the potential to create stress concentrations that make the glass structure susceptible to breakage.

SUMMARY

An electronic device may include electrical components and other components mounted within a housing. The device may include glass structures. As an example, the device may have a display on a front face of the device and may have a glass layer that forms part of the housing on a rear face of the device. The glass layer and other glass structures in the electronic device may be provided with coatings. An interior coating on a glass layer may include multiple layers of material such as an adhesion promotion layer, thin-film layers of materials such as silicon, niobium oxide and other metal oxides, and metals to help adjust the appearance of the coating and therefore the appearance of the electronic device. A metal layer may be formed on top of the coating to serve as an environmental protection layer and opacity enhancement layer.

In some configurations, the coating may include four layers of material. These layers may include a layer on an inner surface of the glass layer. This layer may be formed from a material such as titanium that serves as an adhesion promotion layer. The thickness of high-modulus materials such as titanium on the inner surface of the glass layer may be limited to a relatively small value to prevent these materials from imparting stress to the glass. The titanium layer and/or additional layers in the coating may serve as a buffer layer that prevents stress from brittle materials such as metal oxides and other materials in the coating from adversely affecting the strength of the glass layer. Soft metals such as copper may be used in the buffer layer and/or elsewhere in the coating to adjust color and help block stress. A titanium capping layer or other capping layer may be used as in the coating to prevent degradation to the coating from air exposure and to ensure that the coating has a desired opacity.

DETAILED DESCRIPTION

Electronic devices and other items may be provided with structures that are formed from glass. For example, an electronic device may include a display. The display may have an array of pixels for displaying images for a user. To protect the pixel array from damage, the display may be covered with a layer of glass that serves as a display cover layer. Other portions of electronic devices may also include glass structures. For example, the rear face of an electronic device may be covered with a layer of glass. In this type of arrangement, the glass forms a housing surface that is pleasing to the touch. Glass structures may also be used as optical windows, buttons, and/or other structures in an electronic device.

It may be desirable to form a coating layer on a glass structure to change the appearance of the glass structure. As an example, a blanket coating layer or a patterned coating layer in the shape of a logo, decorative trim, text, or other shape may be formed on the interior surface of a glass layer in an electronic device. The coating may be reflective, may exhibit an appearance with a desired color, may help block internal device components from view, and/or may have other desired optical properties. By forming the coating on the interior of the glass layer, damage to the coating from scratches may be reduced. Configurations in which glass coatings are formed on exterior surfaces of a glass structure may also be used.

Figure 1:
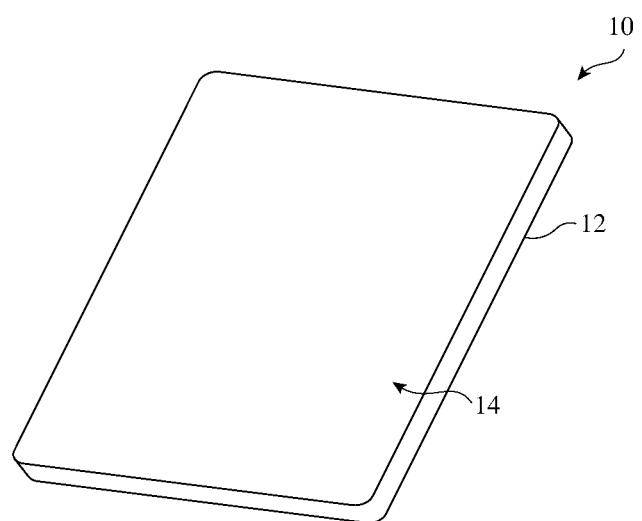
FIG. 1 is a perspective view of an illustrative electronic device of the type that may include a glass structure with a coating in accordance with an embodiment.

An illustrative electronic device of the type that may include glass structures is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may include one or more layers of glass. For example, the outermost layer of display 14, which may sometimes be referred to as a display cover layer, may be formed from a hard transparent material such as glass to help protect display 14 from damage. Other portions of device 10 such as portions of housing 12 and/or other structures may also be formed from glass. For example, walls in housing 12 such as a rear housing wall may be formed from glass.

Figure 2:
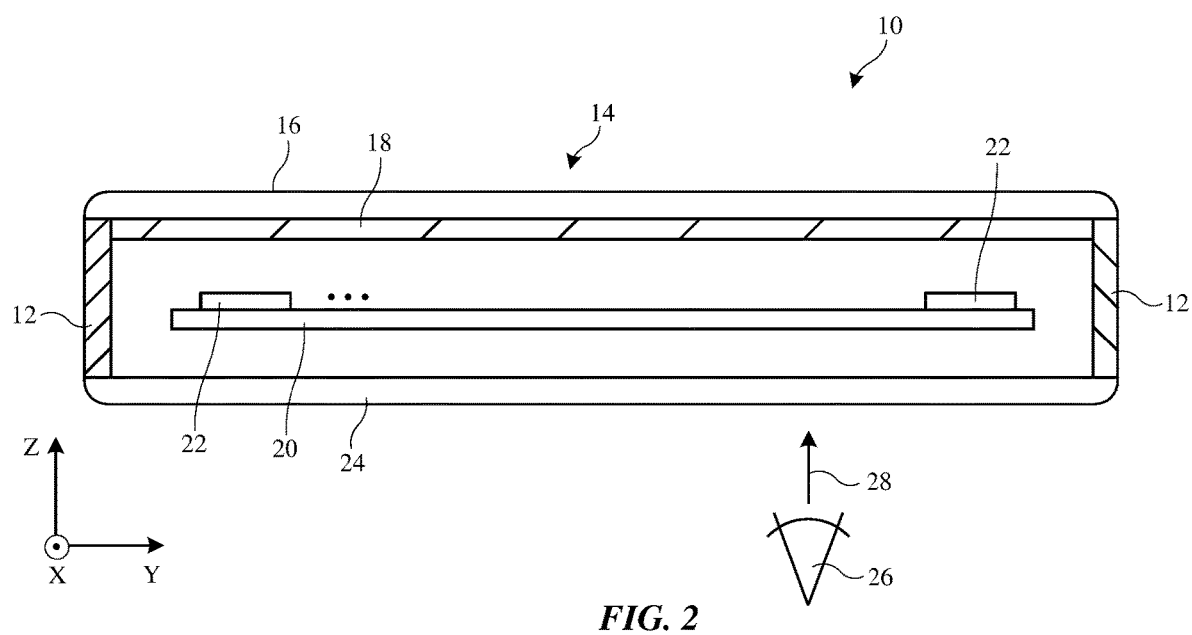
FIG. 2 is a cross-sectional side view of an illustrative electronic device with a coating in accordance with an embodiment.

FIG. 2 is a cross-sectional side view of an illustrative device that contains glass structures such as device 10 of FIG. 1. In the illustrative configuration for device 10 of FIG. 2, housing 12 of device 10 has portions that define sidewalls for device 10. These sidewall portions of housing 12 may be formed from a material such metal (as an example). Display 14 may include display cover layer 16 (e.g., a layer of glass) and display module 18 (e.g., display layers that form an array of pixels that present images for a user on the front face of device 10). Display module 18 may be a liquid crystal display structure, an organic light-emitting diode display structure, or other suitable display. During operation, module 18 may present images that are viewable through display cover layer 16. The rear of the housing for device 10 may be formed from a glass structure such as glass layer 24. Internal components in device 10 such as components 22 (e.g., electrical components such as integrated circuits, sensors, etc.) may be mounted on one or more substrates such as printed circuit 20.

To hide internal components such as components 22 from view, inactive border areas in layer 16 and portions of other glass structures in device 10 such as some or all of glass layer 24 may be covered with coatings. In some arrangements, a coating may be used primarily to block light (e.g., to hide internal device structures from view). In other arrangements, a patterned coating may be used to form text, logos, trim, and/or other decorative patterns. Coatings for glass structures in device 10 may be black or may have non-black colors (e.g., blue, red, yellow, gold, rose gold, red-violet, pink, etc.). If desired, coatings for glass structures in device 10 may be shiny. Coatings on glass layer 24 and/or other glass structures in device 10 may be formed from metals, semiconductors, and/or dielectrics. Materials for the coatings may include organic materials such as polymer layers and/or inorganic materials such as oxide layers, nitride layers, and/or other inorganic dielectric materials.

If care is not taken, the presence of a coating layer on a glass structure such as layer 24 can predispose the glass structure to damage. For example, the likelihood that a glass structure in device 10 will become damaged when exposed to a large amount of stress during a drop event or other event that creates stress on the glass structure can be increased by the presence of a brittle coating layer. Cracks may form in the brittle coating layer and these cracks may create stress concentrations at the interface between the coating layer and the glass that can propagate into the glass during a drop event.

To ensure that a glass structure in device 10 such as layer 24 has a satisfactorily large strength to withstand the stresses encountered during use of device 10, coatings on layer 24 may be formed using configurations that reduce coating-induced stress.

In one illustrative arrangement, some or all of the layers of material in a coating on glass layer 24 may be formed from material that have a Young's modulus of elasticity that matches that of glass layer 24. Glass layer 24 may, as an example, have an elastic modulus (Young's modulus) of 70 GPa. Coating-induced stress may be reduced by forming coatings on glass layer 24 from a material having a Young's modulus that is within 20%, within 10%, within 5%, or other suitable amount of 70 GPa. As an example, a reflective coating on glass layer 24 may be formed from an aluminum layer (Young's modulus 69-70 G Pa). Other examples of materials having modulus values that are close to that of glass layer 24 include tin and copper.

Layers with mismatched elastic modulus values (e.g., material with an elastic modulus of 200 G Pa) will tend to generate undesirable stress on layer 24 unless the thickness of these layers has a suitably low value. If, as an example, a layer of titanium (which has a high modulus) is used as a coating on layer 24, the layer of titanium may be formed to a thickness of 5-10 nm, less than 20 nm, less than 50 nm, at least 1 nm, or other value that is suitably low to ensure that excessive stress is not imparted to glass layer 24. Titanium layers of 100 nm and above that are formed directly on the surface of a glass layer may impart more stress to the glass layer than desired.

In another illustrative configuration, potentially brittle materials such as metal oxides may be used in a coating on glass layer 24 provided that a buffer layer of a ductile material such as metal is formed between the brittle material and glass layer 24. If, as an example, niobium oxide layer is being used in a coating to generate thin-film interference effects and thereby help a coating produce a desired appearance (e.g., a desired color) when observed through glass layer 24, a softer material such as copper may be interposed between the niobium oxide layer and glass layer 24 to help reduce the amount of stress imparted by the niobium layer to glass layer 24. Soft materials such as copper or other soft metals (Al, Sn, etc.) may also be interposed between brittle coating materials (e.g., brittle inorganic layers) in a coating and glass 24 to help protect glass layer 24. In some configurations, thin layers of metals such as titanium may be used as buffer layers for brittle layers such as niobium oxide layers.

Using stress mitigation techniques such as these may allow coatings to be formed on the interior surface of glass layer 24 and/or on other glass structures in device 10 without unduly increasing risks of damage when device 10 is dropped or otherwise subjected to high stress events.

Figure 3:
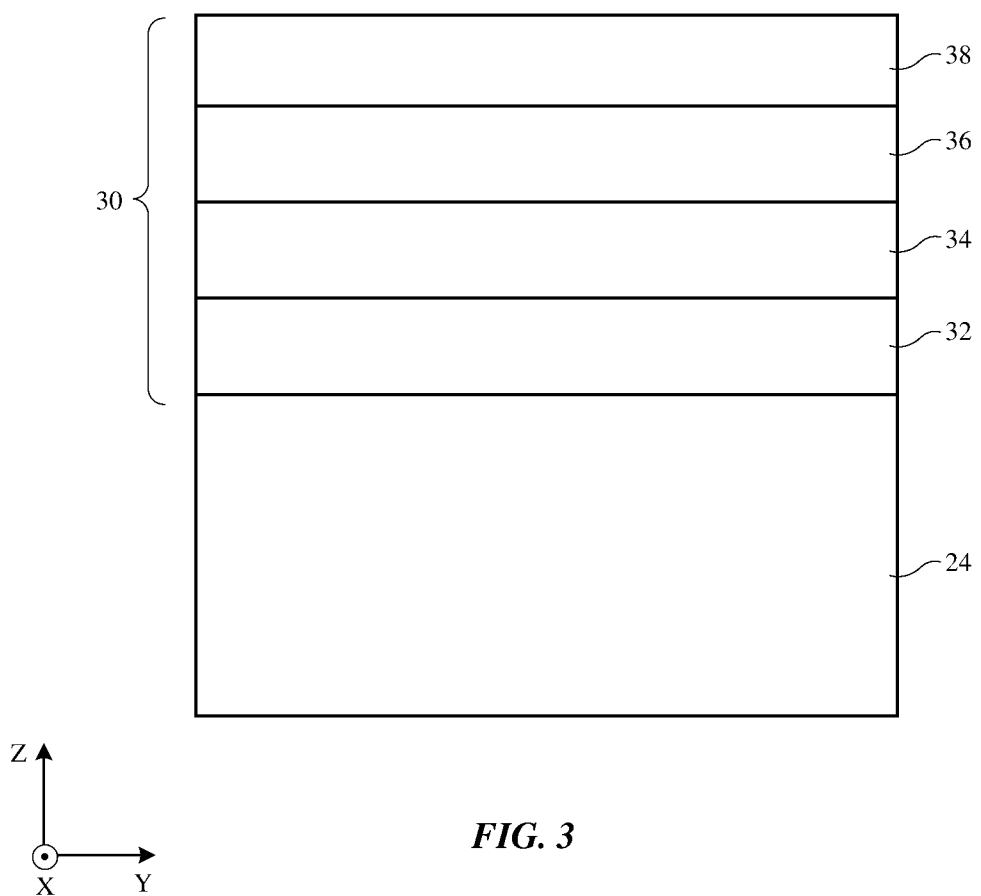
FIGS. 3, 4, and 5 are illustrative glass layers with coatings in accordance with embodiments.

An illustrative coating configuration for glass layer 24 that includes a brittle inorganic material such as a metal oxide is shown in FIG. 3. As shown in the example of FIG. 3, coating 30 may be formed on the inner surface of glass layer 24. Glass layer 24 (e.g., a housing wall structure such as glass layer 24 of FIG. 2) may have a thickness in the Z dimension of 800 microns, at least 300 microns, at least 500 microns, at least 600 microns, less than 2000 microns, less than 1200 microns, less than 1000 microns, or other suitable thickness. Layer 30 may have a thickness of at least 10 nm, at least 50 nm, at least 250 nm, less than 500 nm, less than 100 nm, or other suitable thickness.

In the example of FIG. 3, layer 30 includes four layers. Configurations for layer 30 that include at least two layers, at least three layers, at least four layers, at least five layers, or fewer six layers may be used, if desired. Layer 30 may be deposited by physical vapor deposition techniques or other suitable fabrication techniques. Shadow masking, photolithography, and/or other patterning techniques may optionally be used to form coatings on glass layer 24, if desired (e.g., these patterning techniques may be used to pattern layer 30 of FIG. 3).

The materials and the thicknesses of the materials that make up layers 30 may be configured to reduce stress on glass layer 24 while producing a coating on the interior surface of glass layer 24 that presents a desired appearance as layer 30 is viewed through layer 24 by a user of device 10. In some situations, layer 30 may be configured to exhibit a rose gold appearance or a red-violet (blush) appearance. Other colors can be produced by adjusting the thicknesses and materials of the layers that make up layer 30. The use of coating layer 30 to produce a rose gold or red-violet appearance for the rear housing wall of device 10 is merely illustrative.

In the illustrative configuration of FIG. 3, layer 32 is a layer of a metal such as titanium. Layer 32 may have a thickness of 5-7 nm, at least 2 nm, at least 3 nm, less than 15 nm, less than 10 nm, or other suitable thickness. Layer 32 may serve as an adhesion promotion layer for coating 30. Titanium for layer 32 can be deposited by sputtering (as an example) to form a stable base layer for coating layer 30. The thickness of layer 32 of FIG. 3 is not large enough to render layer 32 completely opaque, so additional layers in layer 30 can be configured to adjust the appearance of layer 30.

Layer 34 may be deposited on layer 32. In the illustrative configuration of FIG. 3, layer 34 is an inorganic dielectric layer that is used in adjusting the appearance of layer 30 (e.g., the color of layer 30). Layer 34 may be, for example, a metal oxide such as niobium oxide. The thickness of layer 34 may 3-6 nm, at least 1 nm, at least 2 nm, at least 3 nm, less than 20 nm, less than 7 nm, or other suitable thickness. When layer 34 is formed from a material such as niobium oxide, layer 34 will be relatively brittle. Titanium layer 32, which is sufficiently thin to avoid imposing undesired stress on layer 24, serves as a ductile buffer layer that helps reduce stress on layer 24 from layer 34. In configurations of this type in which a buffer layer in coating 30 is formed from a material such as titanium or other metal with a relatively higher elastic modulus (e.g., over 75 GPa or over 100 GPa), it may be desirable for the ratio of the thickness Ta of the buffer layer material (e.g., the thickness of layer 32 of FIG. 3) to the thickness Tb of the brittle material (e.g., the thickness of layer 34) to be greater than 1.5. When this minimum ratio of Ta to Tb is observed, coating layer 30 will not excessively weaken glass layer 24.

Layer 36 of coating layer 30 of FIG. 3 may be formed from a metal such as copper that helps impart a desired color to layer 30 and that may block stress from subsequently deposited layers such as layer 38. The thickness of layer 36 may be 24-35 nm, at least 10 nm, at least 15 nm, less than 70 nm, less than 40 nm, or other suitable thickness.

Layer 38 may be formed on layer 36. Layer 38 may be formed from a material such as titanium and may have a thickness of 50 nm, at least 10 nm, at least 20 nm, at least 30 nm, at least 40 nm, less than 100 nm, less than 75 nm, or less than 60 nm. The innermost surface of coating 30 (the surface of coating 30 facing interior components such as components 22 of device 10 of FIG. 2) may be exposed to air in the interior of device 10. Exposed copper can react with air and is therefore not highly stable. By forming layer 38 on top of layer 36, coating 30 is protected from environmental degradation. The opacity of layer 30 and therefore the ability of layer 30 to prevent external viewing of internal device components through layer 24 and layer 30 can also be enhanced by the presence of layer 38.T The protective metal of layer 38 (e.g., titanium) may have a high modulus, so the presence of a soft underlying layer such as copper layer 36 may help reduce any stress imparted to layer 24 by layer 38. To adjust the color of coating layer 30, the relative thicknesses and types of materials used for layers 32, 34, 36, and 38 may be adjusted (e.g., to adjust thin-film interference effects and/or bulk spectral effects associated with these layer). In some configurations, additional layers and/or fewer layers may be used in forming coating layer 30. The arrangement of FIG. 3 is illustrative.

If desired, soft metals (e.g., copper, tin, silver, etc.) may be placed between a brittle layer such as a niobium oxide layer and glass 24. For example, in coating layer 30, layer 34 may be a copper layer (e.g., e.g., a copper layer of at least 5 nm in thickness, of less than 50 nm of thickness, or other suitable thickness) and layer 36 may be a niobium oxide layer (e.g., a layer of at least 5 nm in thickness, of less than 10 nm in thickness, or other suitable thickness). In this type of arrangement, the titanium and copper layers at the bottom of layer 30 serve as a buffer layer of collective thickness Ta that blocks stress from the overlying niobium oxide layer of thickness Tb. In situations such as these in which the buffer layer in coating layer 30 contains soft metals, the ratio of Ta to Tb should generally be at least 1.0 to block stress effectively.

Figure 4:
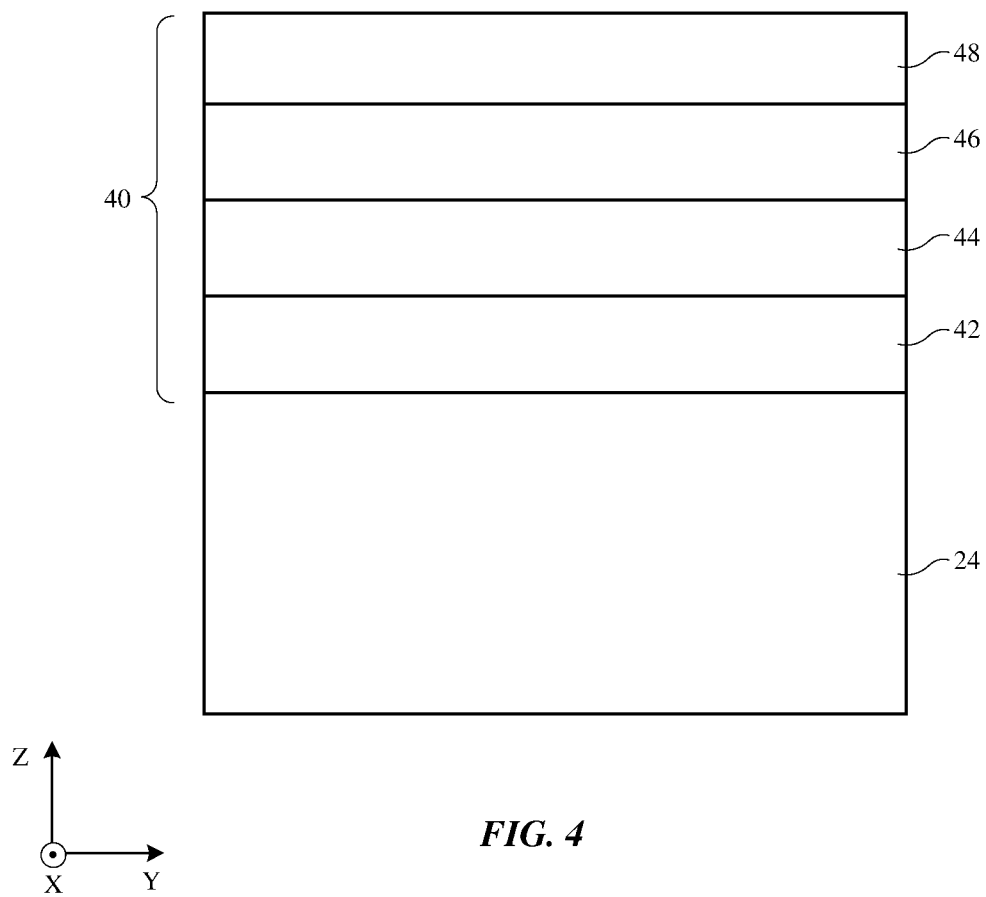

Another illustrative coating configuration for glass layer 24 is shown in FIG. 4. In this example, coating layer (coating) 40 has layers such as layers 42, 44, 46, and 48. There may be at least two layers of material in layer 40, at least three layers, at least four layers, at least five layers, fewer than six layers, or other suitable number of layers in layer 40 to achieve a desired appearance for layer 40 when viewed by a user through glass layer 24. With one illustrative configuration, the layers of layer 40 are configured so that layer 40 imparts a dark gray appearance to device 10 when viewed through glass layer 24. Other colors may be produced by layer 40, if desired (e.g., black, bluish black, silver, etc.).

Layer 42 may be a metal layer such as a titanium layer that serves as an adhesion promotion layer for layer 40. The thickness of layer 42 may be 15-20 nm, at least 5 nm, at least 10 nm, less than 20 nm, less than 30 nm, less than 25 nm, or other suitable thickness.

Layers 44 and 46 may be formed from inorganic materials. For example, layer 44 may be formed from a material such as silicon or a material such as niobium oxide or other inorganic dielectric material (e.g., metal oxides, etc.). Layer 46 may be formed from a material that allows layers 44 and 46 and the other thin-film layers of coating layer 40 to produce a desired color for device 10 (e.g., through thin-film interference effects and other optical effects). For example, if layer 44 is a silicon layer, layer 46 may be a niobium oxide layer and if layer 44 is a niobium oxide layer, layer 46 may be a silicon layer. The thickness of layer 44 may be 5-8 nm, at least 2 nm, at least 4 nm, less than 20 nm, less than 10 nm, or other suitable thickness. The thickness of layer 46 may be 7-8 nm, at least 3 nm, at least 5 nm, less than 20 nm, less than 10 nm, or other suitable thickness.

Layer 48 may be formed on layer 46 to provide layer 40 with environmental protection and a desired opacity. Layer 48 may be, for example, a layer of titanium having a thickness of 50 nm, at least 10 nm, at least 30 nm, at least 40 nm, less than 75 nm, or other suitable thickness.

In a configuration of the type shown in FIG. 4, layer 42 may serve as a metal buffer layer that helps block excess stress from brittle layers such as layers 44 and 46. To help ensure that layer 42 adequately buffers stress from layers 44 and 46, the ratio of the thickness Ta of titanium layer 42 to the collective thickness Tb of brittle material in coating 40 (e.g., the collective thickness of layers 44 and 46) may be greater than 1.5.

Figure 5:
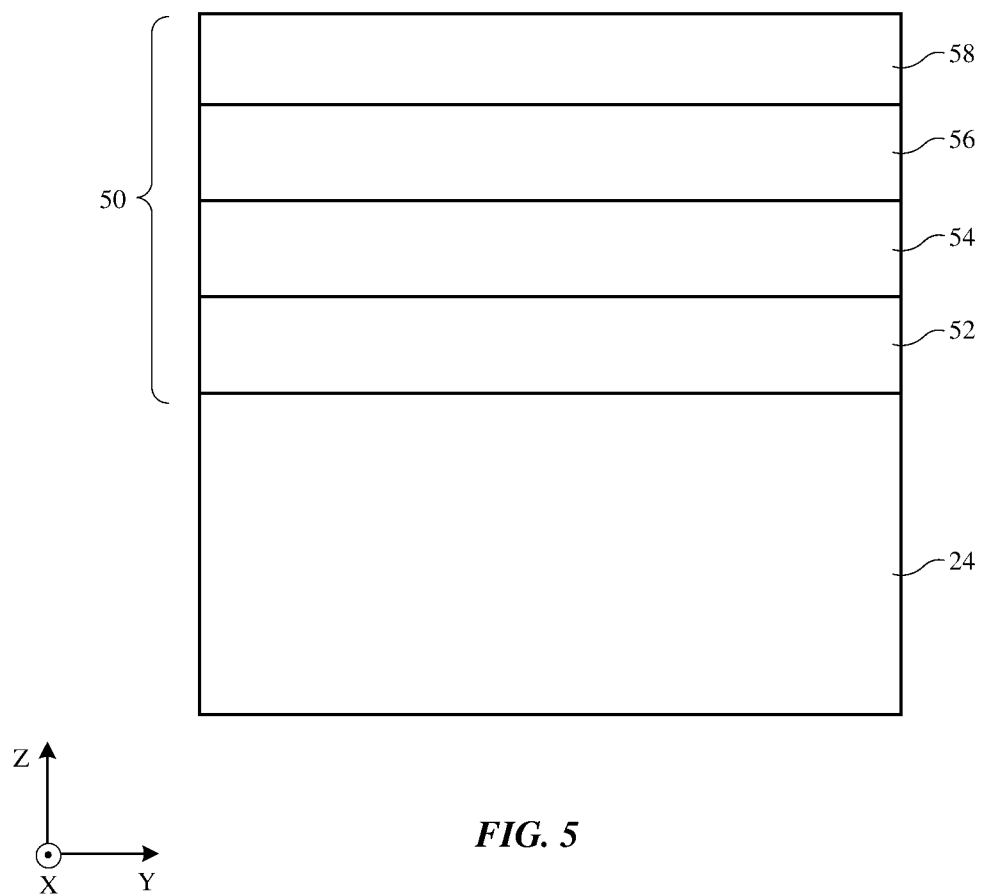

In some configurations, coatings on layer 24 may include organic materials such as colored ink. As shown in FIG. 5, for example, coating 50 may include ink layer 58 on top of one or more other layers such as layers 52, 54, and 56. Layer 58 may be coated with a titanium layer or other environmental capping layer or may be left uncovered.

Layer 52 of FIG. 5 may be an adhesion promotion layer formed from a metal such as titanium (e.g., a titanium layer of at least 5 nm in thickness, of less than 10 nm in thickness, less than 20 nm in thickness, or other suitable thickness). Layer 54 may be a copper layer or other soft metal layer (e.g., a layer of at least 5 nm in thickness, less than 50 nm in thickness, or other suitable thickness) and layer 56 may be a niobium oxide layer, other metal oxide layer, or other layer of material (e.g., a layer having a thickness of at least 5 nm, of less than 10 nm, or other suitable thickness) for helping to produce thin-film interference effects to adjust color. If desired, layer 56 may be a copper layer or other soft metal layer (e.g., a layer of at least 5 nm in thickness, less than 50 nm in thickness, or other suitable thickness) and layer 54 may be a niobium oxide layer, other metal oxide layer, or other layer of material (e.g., a layer having a thickness of at least 5 nm, of less than 10 nm, or other suitable thickness) for helping to produce thin-film interference effects to adjust color. Layer 58 may be formed from a polymer binder that contains dye and/or pigment of desired colors to help adjust the appearance of layer 50.

The foregoing is merely illustrative and various modifications can be made to the described embodiments. The foregoing embodiments may be implemented individually or in any combination.

What is claimed is:

1. An electronic device, comprising:
   a housing having a glass portion; and
   a coating on the glass portion, wherein the coating includes a metal adhesion promotion layer on the glass portion, a second layer, and a third layer that is interposed between the metal adhesion promotion layer and the second layer and that is formed from a material that is different from at least one of the metal adhesion promotion layer or the second layer.

2. The electronic device defined in claim 1 wherein the second layer is configured to environmentally protect the coating from exposure to air.

3. The electronic device defined in claim 2 wherein the third layer comprises a metal oxide.

4. The electronic device defined in claim 3 wherein the metal oxide comprises niobium oxide.

5. The electronic device defined in claim 4 wherein the third layer comprises silicon.

6. The electronic device defined in claim 5 further comprising a fourth layer interposed between the metal adhesion layer and the second layer, wherein the fourth layer comprises a metal oxide.

7. The electronic device defined in claim 6 wherein the fourth layer comprises niobium oxide.

8. The electronic device defined in claim 2 wherein the third layer comprises a metal.

9. The electronic device defined in claim 2 wherein the third layer comprises a metal selected from the group consisting of tin, copper, and aluminum.

10. The electronic device defined in claim 1 wherein the second layer comprises titanium.

11. The electronic device defined in claim 10 wherein the metal adhesion promotion layer comprises titanium.

12. The electronic device defined in claim 1 wherein the metal adhesion promotion layer and the second layer are formed from a common material.

13. The electronic device defined in claim 12 wherein the common material is titanium and wherein the metal adhesion promotion layer has a thickness of less than 20 nm.

14. An electronic device, comprising:
    a housing comprising a glass portion; and
    a coating on the glass portion, wherein the coating includes:
      a first layer on the glass portion;
      a second layer on the first layer;
      a third layer on the second layer; and
      a fourth layer on the third layer, wherein the second and third layers are formed from different materials than the first and fourth layers.

15. The electronic device defined in claim 14 wherein the first layer comprises a metal layer and wherein at least one of the second and third layers is a metal oxide.

16. The electronic device defined in claim 15 wherein the second and third layers are formed from different materials.

17. The electronic device defined in claim 16 wherein at least one of the second and third layers comprises a metal.

18. The electronic device defined in claim 17 wherein at least one of the second and third layers comprises silicon.

19. The electronic device defined in claim 18 wherein the fourth layer comprises titanium.

20. An electronic device, comprising:
    a housing comprising glass; and
    a coating on the glass, wherein the coating includes a first layer on an interior surface of the glass, a second layer, and a third layer that is interposed between the first and second layers and that is formed from a material that is different from at least one of the first and second layers, wherein the first layer has a first thickness, the second layer has a second thickness, the third layer has a third thickness, the second layer comprises a metal oxide layer, and a ratio of a sum of the first and third thicknesses to the second thickness is at least one.

* * * * *